(12) United States Patent
Eichhorn et al.

(10) Patent No.: US 12,385,446 B2
(45) Date of Patent: Aug. 12, 2025

(54) INTERNAL COMBUSTION ENGINE WITH SPARK PLUG AND PRECHAMBER SPARK PLUG

(71) Applicant: Robert Bosch GmbH, Stuttgart (DE)

(72) Inventors: Alexander Eichhorn, Freiberg (DE); Alexander Hettinger, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/546,559

(22) PCT Filed: Feb. 16, 2022

(86) PCT No.: PCT/EP2022/053790
§ 371 (c)(1),
(2) Date: Aug. 15, 2023

(87) PCT Pub. No.: WO2022/179910
PCT Pub. Date: Sep. 1, 2022

(65) Prior Publication Data
US 2024/0133350 A1  Apr. 25, 2024
US 2024/0229734 A9  Jul. 11, 2024

(30) Foreign Application Priority Data
Feb. 26, 2021 (DE) .................. 10 2021 104 627.0

(51) Int. Cl.
*F02F 1/24* (2006.01)
*F02B 19/10* (2006.01)
(Continued)

(52) U.S. Cl.
CPC .............. *F02F 1/242* (2013.01); *F02B 19/12* (2013.01); *F02D 41/0255* (2013.01);
(Continued)

(58) Field of Classification Search
CPC .............. F02B 19/1028; F02B 19/1033; F02B 19/1061; F02B 19/1066; F02B 19/12;
(Continued)

(56) References Cited

U.S. PATENT DOCUMENTS 5,261,367 A * 11/1993 Yamamoto .............. F02B 23/08
123/638
5,269,270 A * 12/1993 Suzuki .................... F01L 1/267
123/193.5
(Continued)

FOREIGN PATENT DOCUMENTS

AT  522438 A4  11/2020
AT  522462 A4  11/2020
(Continued)

OTHER PUBLICATIONS

International Search Report corresponding to PCT Application No. PCT/EP2022/053790, mailed Jul. 29, 2022 (German and English language document) (8 pages).

*Primary Examiner* — Binh Q Tran
(74) *Attorney, Agent, or Firm* — Maginot, Moore & Beck LLP

(57) ABSTRACT

The present disclosure relates to an internal combustion engine comprising at least one cylinder, four charge-exchange points per cylinder, wherein a first and a second charge-exchange port are each an inlet port, and wherein a third and a fourth charge-exchange port are each an outlet port, also comprising one spark plug and one prechamber spark plug per each cylinder.

19 Claims, 5 Drawing Sheets

(51) Int. Cl.
*F02B 19/12* (2006.01)
*F02B 23/06* (2006.01)
*F02D 41/02* (2006.01)
*F02F 1/42* (2006.01)
*F02P 5/15* (2006.01)
*F02P 9/00* (2006.01)
*F02P 15/02* (2006.01)
*F02P 15/04* (2006.01)
*F02P 15/08* (2006.01)

(52) U.S. Cl.
CPC ............ *F02P 5/1504* (2013.01); *F02P 15/02* (2013.01); *F02B 19/1028* (2013.01); *F02B 23/0657* (2013.01); *F02F 2001/241* (2013.01); *F02F 1/4221* (2013.01); *F02P 9/007* (2013.01); *F02P 15/04* (2013.01); *F02P 15/08* (2013.01)

(58) Field of Classification Search
CPC ......... F02B 2023/085; F02B 2023/102; F02B 2075/125; F02B 17/005; F02B 23/101; F02B 23/0657

See application file for complete search history.

(56) References Cited

U.S. PATENT DOCUMENTS

| | | | | |
|---|---|---|---|---|
| 5,327,864 | A | * | 7/1994 | Regueiro ............... F02B 17/005 |
| | | | | 123/260 |
| 5,893,348 | A | * | 4/1999 | Feuling .................. F02F 1/242 |
| | | | | 123/310 |
| 6,209,512 | B1 | | 4/2001 | Castiglioni |
| 6,286,482 | B1 | * | 9/2001 | Flynn ................. F02D 13/0215 |
| | | | | 123/480 |
| 6,935,302 | B2 | * | 8/2005 | Kashiwagura ........ F02P 5/1502 |
| | | | | 123/305 |
| 7,234,441 | B2 | * | 6/2007 | Isaji ....................... F02P 15/02 |
| | | | | 123/309 |
| 2009/0229569 | A1 | * | 9/2009 | Glugla ..................... F02P 3/04 |
| | | | | 123/406.2 |
| 2017/0107938 | A1 | * | 4/2017 | Assanis .................. F02B 19/16 |
| 2019/0360385 | A1 | | 11/2019 | Kulzer |

FOREIGN PATENT DOCUMENTS

| | | |
|---|---|---|
| DE | 10 2018 112 450 A1 | 11/2019 |
| DE | 10 2019 205 478 A1 | 10/2020 |
| DE | 10 2020 110 960 A1 | 10/2020 |
| EP | 3 453 856 A1 | 3/2019 |
| EP | 3 561 255 A1 | 10/2019 |
| EP | 3 855 008 A1 | 7/2021 |
| JP | H5-98966 A | 4/1993 |
| JP | H8-284665 A | 10/1996 |
| JP | 2019-183809 A | 10/2019 |
| JP | 2020-94554 A | 6/2020 |

* cited by examiner

INTERNAL COMBUSTION ENGINE WITH SPARK PLUG AND PRECHAMBER SPARK PLUG

This application is a 35 U.S.C. § 371 National Stage Application of PCT/EP2022/053790, filed on Feb. 16, 2022, which claims the benefit of priority to Serial No. DE 10 2021 104 627.0, filed on Feb. 26, 2021 in Germany, the disclosures of which are incorporated herein by reference in their entirety.

BACKGROUND

The present disclosure relates to an internal combustion engine having a spark plug and a prechamber spark plug, and to a method for operating an internal combustion engine.

Internal combustion engines comprising prechamber spark plugs are known from the prior art. Prechamber spark plugs comprise, as is known for conventional spark plugs, a center electrode arranged in a housing and a earth electrode, which define between them an ignition gap in which an air-fuel mixture is ignited. This ignited air-fuel mixture is subsequently fed through ports in a plug cap located at the combustion chamber end of the prechamber spark plug into a combustion chamber of the internal combustion engine, in which the actual combustion of an air-fuel mixture for the piston stroke takes place. For example, DE 10 2019 205 478 A1 discloses such a prechamber spark plug.

SUMMARY

In contrast, the internal combustion engine according to the disclosure having the features disclosed herein is characterized by an improved mode of operation which enables a particularly high efficiency with a low knock tendency and a reliable operation in any operating conditions. According to the disclosure, this is achieved by an internal combustion engine which comprises at least one cylinder and which comprises one spark plug and one prechamber spark plug per cylinder. The internal combustion engine further comprises four charge-exchange ports per cylinder. A first charge-exchange port and a second charge exchange port are each inlet ports, and a third charge exchange port and a fourth charge exchange port are each outlet ports.

A "spark plug" is in this context understood to be an ordinary spark plug, in particular with exposed electrodes, which is configured to ignite a fuel-air mixture by means of an electrical spark between at least two electrodes. Particularly preferably, the spark plug comprises a straight center electrode and at least one hook-shaped front or roof electrode. In particular, such a spark plug can alternatively be referred to as a "spark plug". Alternatively, a laser device could be used as a "spark plug", which is configured to ignite the fuel-air mixture by means of laser radiation.

A "prechamber spark plug" is a design with a prechamber formed within a plug cap, which is in fluid communication with a combustion chamber of the internal combustion engine via passage ports in the plug cap. As a result, gases are able to pass from the prechamber through the plug cap into the combustion chamber, and vice versa. Preferably, the plug cap is arranged at a combustion chamber-side end of a housing of the prechamber spark plug as viewed in the axial direction of the prechamber spark plug. The plug cap, housing, and prechamber form integral components of the prechamber spark plug. In particular, the prechamber is therefore located inside the prechamber spark plug. Inside the prechamber, electrodes are used to ignite a fuel-air mixture in the prechamber, in which case flare jets pass through the passage ports in the plug cap and ignite the fuel-air mixture in the combustion chamber. In other words, the actual ignition of the fuel-air mixture in the combustion chamber takes place by means of the flare jets generated by the prechamber spark plug. The term "prechamber spark plug" is in this context regarded as an integral component which can be mounted in a cylinder head of the internal combustion engine. Preferably, the fastening is performed such that, in an end position, the through passage ports in the plug cap are aligned in a predefined manner, in particular in order to generate specifically aligned flare jets during operation. For example, the prechamber spark plug can be designed to be screwed into a standard thread of the cylinder head that can accommodate an ordinary spark plug.

The combination of a conventional spark plug and a prechamber spark plug offers the advantage of a particularly flexible, efficient, and reliable operation of the internal combustion engine. In other words, optimum and reliable ignition of the fuel-air mixture in the combustion chamber can always take place in any operating state, such as cold start, catalytic converter heating phase, partial load, full load, and the like. Preferably, an operation of the internal combustion engine can be designed to use the prechamber spark plug as the sole ignition option in the widest possible operating range to achieve effective knock reduction and low fuel consumption, particularly at a high load. The spark plug can be operated additionally or alone in operating ranges in which operation of the prechamber spark plug is disadvantageous or impossible, for example during a cold start, in order to achieve reliable ignition in these ranges as well. Doing so results in the further advantage that the prechamber spark plug can be specifically optimized for the most efficient operation possible, for example for certain operating points of the internal combustion engine, in which case a decrease in efficiency at other operating points can be disregarded or accepted, since at these operating points, the spark plug can, e.g., be used alone or additionally for ignition. In addition, the ignition, which can always be optimally adjusted for a wide range of operating ranges, can prevent damage to the internal combustion engine, e.g., due to knocking, misfiring or poor combustion, thus enabling a particularly long service life of the internal combustion engine.

The disclosure discloses preferential embodiments of the disclosure.

Preferably, the spark plug and/or the prechamber spark plug is arranged on a combustion chamber roof of a combustion chamber of the cylinder. In particular, the combustion chamber roof forms an upper end of the combustion chamber along a stroke direction of a piston. Preferably, the combustion chamber roof is part of a cylinder head of the internal combustion engine. The prechamber spark plug and the spark plug preferably protrude into the combustion chamber. Preferably, a plug cap of the prechamber spark plug and electrodes of the spark plug protrude into the combustion chamber. Alternatively, combustion chamber-side ends of the prechamber spark plug and the spark plug can also be arranged within a respective plug bore in which the corresponding prechamber spark plug or spark plug is arranged.

Further preferably, the prechamber spark plug is arranged closer to a center point of the combustion chamber roof than the spark plug. As a result, it is easy to achieve particularly uniform penetration of the combustion chamber by means of the generated flare jets for uniform ignition of the fuel-air mixture. Alternatively, the spark plug is preferably arranged closer to the center point of the combustion chamber roof than the prechamber spark plug in order to achieve particularly effective and uniform ignition by means of the spark plug.

The prechamber spark plug is preferably arranged closer to a sidewall of the cylinder than the spark plug. Preferably, the prechamber spark plug in this case is designed and arranged so that flare jets generated by means of the prechamber spark plug during ignition are aligned in the direction of a combustion chamber center. Alternatively, the spark plug is arranged closer to the sidewall of the cylinder than the prechamber spark plug. As a result, more space is available for the prechamber spark plug in the area of the combustion chamber roof center to enable high efficiency of operation of the prechamber spark plug. In this context, the term "sidewall" is regarded as an essentially cylindrical lateral surface of the cylinder, which can also be referred to as the running surface of the piston.

Particularly preferably, the prechamber spark plug is arranged closer to at least one of the two inlet ports, in particular closer to both inlet ports, than the spark plug. Doing so enables a particularly advantageous supply of fresh combustion air to the prechamber spark plug to enable optimum ignition during operation. Alternatively, the prechamber spark plug is preferably arranged closer to at least one of the two outlet ports, in particular closer to both outlet ports, than the spark plug. In this case, the spark plug can be arranged particularly close to at least one of the inlet ports to enable an optimum supply of fresh air to the spark plug.

Preferably, the spark plug is arranged on the inlet side or outlet side of the prechamber spark plug. The terms "inlet side" or "outlet side" are regarded as reference directions indicating a relative arrangement of the inlet ports and outlet ports with respect to each other or to the combustion chamber roof. In particular, the phrase "inlet-side arrangement of the spark plug with respect to the prechamber spark plug" means that the spark plug is arranged along an axis extending from the outlet ports to the inlet ports further in the direction facing the inlet ports than the prechamber spark plug, i.e., the spark plug is arranged closer to the inlet port than the prechamber spark plug. It is particularly advantageous if the spark plug is arranged on the outlet side of the prechamber spark plug, i.e. the spark plug is arranged closer to the outlet port than the prechamber spark plug. In particular, in this case the prechamber spark plug is located closer to the inlet ports than the spark plug. As a result, particularly during operation of the prechamber spark plug, the fresh air entering through the inlet port or the entering fuel-air mixture can be ignited in a particularly targeted manner due to the proximity of the prechamber spark plug.

Further preferably, the charge exchange ports are arranged in the combustion chamber roof, the combustion chamber roof being divided into four quadrants by two mutually perpendicular sectional planes. The combustion chamber roof is divided by the two sectional planes such that one of the four charge exchange ports is located in each of the four quadrants. In this case, the spark plug and/or the prechamber spark plug is arranged, in particular substantially, on one of the two sectional planes. In other words, the two sectional planes are each centered between the charge-exchange ports. Preferably, the two sectional planes intersect in a line of intersection that is parallel to a piston direction along which a piston of the internal combustion engine is movable. In other words, the spark plug and/or the prechamber spark plug lies substantially symmetrically between two charge-exchange ports. Particularly preferably, the two sectional planes form symmetry planes of the combustion chamber roof. By arranging the spark plug and/or the prechamber spark plug on one of the two sectional planes, a particularly advantageous arrangement can be achieved, since in this case those areas with the greatest free space requirement on the combustion chamber roof are available and, in addition, enable essentially central ignition for uniform ignition of the fuel-air mixture.

Preferably, the spark plug and/or the prechamber spark plug is arranged within a center point area of the combustion chamber roof. The center point area lies substantially radially within the charge-exchange ports, and in particular surrounds an area around a center point or roof center of the combustion chamber roof. Particularly preferably, the prechamber spark plug is arranged exactly on a center point of the combustion chamber roof. Particularly preferably, the center point area is defined by a maximally large circle inscribed centrally between the charge-exchange ports. In other words, the spark plug and/or the prechamber spark plug is preferably located centrally on the combustion chamber roof, which enables particularly symmetrical, uniform penetration and thus simultaneous ignition within the entire combustion chamber. Particularly in the case of a central prechamber spark plug, this can enable particularly uniform penetration of the combustion chamber by the flare jets which achieve ignition, and thus uniform and efficient combustion.

Particularly preferably, the spark plug and/or the prechamber spark plug is arranged between two adjacent charge-exchange ports and the sidewall of the cylinder. In particular, the spark plug and/or the prechamber spark plug is located radially outside a center point circle on which the center points of the four charge exchange ports lie. In other words, the spark plug and/or the prechamber spark plug is arranged within a free radially outer region of the combustion chamber roof. In particular, four such radially outer and free regions are distributed around the circumference of the combustion chamber roof. Doing so enables the available space on the combustion chamber roof to be utilized particularly advantageously for the arrangement of all components. For example, it is particularly advantageous if one of the spark plugs and prechamber spark plugs is arranged inside the center point area and the other radially outside. Preferably, a distance between the sidewall of the cylinder and the spark plug and/or a distance between the sidewall of the cylinder and the prechamber spark plug is no more than 30%, preferably no more than 15%, of a cylinder radius of the cylinder. Due to the lateral arrangement near the sidewall, the spark plug and/or the prechamber spark plug is also at a large distance from the center of the combustion chamber, which means that, e.g., a thermal load is lower than in a central arrangement. Doing so has a beneficial effect on a long service life of the spark plug and/or the prechamber spark plug.

Preferably, the internal combustion engine further comprises a combustion chamber fuel injector which is arranged to inject fuel, in particular liquid or gaseous fuel, directly into the combustion chamber of the internal combustion engine.

Preferably, the combustion chamber fuel injector is arranged on the combustion chamber roof. In particular, the combustion chamber fuel injector is thus located in the vicinity of the prechamber spark plug and/or the spark plug in order to generate a uniform fuel-air mixture, preferably aligned with the position of the prechamber spark plug and/or spark plug, for homogeneous uniform ignition.

Particularly preferably, the combustion chamber fuel injector is arranged between two adjacent charge-exchange ports and the sidewall of the cylinder. In particular, the combustion chamber fuel injector lies radially outside a center point circle on which center points of the four charge exchange ports lie. In other words, the combustion chamber fuel injector is located within a free radially outer area of the combustion chamber roof. In particular, the combustion chamber fuel injector is in this case configured to inject the fuel in the direction of a center of the combustion chamber in order to obtain uniform distribution and ignition. In particular, the combustion chamber fuel injector is in this case configured to inject the fuel in the direction of a center of the combustion chamber in order to obtain uniform distribution and ignition. In addition, the lateral arrangement results in a greater distance between the combustion chamber fuel injector and the center of the combustion chamber, which can have a beneficial effect on lowering the thermal load on the combustion chamber fuel injector to enable a long service life.

Preferably, a distance between the combustion chamber fuel injector and the sidewall of the cylinder is no more than 30%, particularly preferably no more than 15%, of the cylinder radius. In other words, the combustion chamber fuel injector is preferably arranged close to the sidewall, i.e., it is not located centrally but laterally on the combustion chamber roof. Preferably, in this case, the combustion chamber fuel injector is oriented at an angle so that an injection direction of the fuel to be injected is oriented towards the center of the combustion chamber. The lateral arrangement of the combustion chamber fuel injector enables a particularly space-saving arrangement on the combustion chamber roof, wherein more space is available for the arrangement of the spark plug and/or the prechamber spark plug, in particular in the central area of the combustion chamber roof.

Particularly preferably, the combustion chamber fuel injector and the prechamber spark plug are arranged on opposite sides of the combustion chamber roof. Alternatively or additionally, the combustion chamber fuel injector and the spark plug are preferably arranged on opposite sides of the combustion chamber roof. In particular, an opposite arrangement with respect to a center point of the combustion chamber roof is regarded as opposite in this context. Doing so enables particularly advantageous utilization of the free space available for arranging the components on the combustion chamber roof.

Preferably, the combustion chamber fuel injector is arranged within a center point area of the combustion chamber roof, the center point area being radially within the charge-exchange ports. Particularly preferably, the combustion chamber fuel injector is arranged exactly on a center point of the combustion chamber roof. By arranging the combustion chamber fuel injector centrally on the combustion chamber roof, a particularly uniform, preferably symmetrical, injection into the combustion chamber can be achieved to enable particularly uniform fuel distribution in the combustion chamber and efficient combustion.

Particularly preferably, the prechamber spark plug is arranged closer to the combustion chamber fuel injector than the spark plug. Such an arrangement of combustion chamber fuel injector and prechamber spark plug close to each other has a particularly beneficial effect on efficient and reliable operation of the prechamber spark plug. The proximity between the combustion chamber fuel injector and the prechamber spark plug result in improved scavenging and mixture supply to the prechamber spark plug. Alternatively, the spark plug is preferably arranged closer to the combustion chamber fuel injector than the prechamber spark plug. In this case, a particularly advantageous mixture supply can be provided in the area of the spark plug. Such an arrangement of combustion chamber fuel injector and spark plug close to each other enables, e.g., a particularly robust operation of the internal combustion engine during a catalyst heating.

Preferably, the combustion chamber fuel injector and the prechamber spark plug are arranged at a distance of no more than 50%, in particular no more than 30%, preferably no more than 10%, of a cylinder radius of the cylinder.

Preferably, the combustion chamber fuel injector and the spark plug are arranged at a distance of no more than 50%, in particular no more than 30%, preferably no more than 10%, of the cylinder radius of the cylinder.

Particularly preferably, an injection direction, i.e., a direction along which the fuel is essentially injected, of the combustion chamber fuel injector is aligned in the direction of the prechamber spark plug, in particular aligned with a plug cap of the prechamber spark plug. Doing so makes it possible to achieve particularly advantageous scavenging and mixture supply to the prechamber of the prechamber spark plug. Alternatively, the direction of injection is preferably substantially in the direction of the spark plug.

Preferably, the internal combustion engine further comprises an intake manifold fuel injector arranged to inject fuel into an intake manifold of the internal combustion engine. In particular, the internal combustion engine comprises two intake manifolds, each with an intake manifold fuel injector, each intake manifold port into the combustion chamber at one of the two inlet ports. Alternatively, the internal combustion engine can also comprise exactly one intake manifold fuel injector, which is arranged to inject fuel into both intake manifolds. Further alternatively, the internal combustion engine may comprise exactly one intake manifold fuel injector, which is configured to inject fuel into a common intake manifold section, the intake manifold section dividing into the two intake manifolds in the direction of the combustion chamber. The intake manifold fuel injector is advantageously provided as an alternative to a direct injection combustion chamber fuel injector arranged on the combustion chamber. As a result, there is particularly large space available on the combustion chamber roof for the spark plug and the prechamber spark plug for optimum arrangement in each case.

The disclosure further relates to a method for operating an internal combustion engine which comprises at least one cylinder and four charge-exchange ports per cylinder, a spark plug, and a prechamber spark plug. The spark plug and/or the prechamber spark plug is operated to ignite a fuel-air mixture within the combustion chamber of the cylinder. In other words, during operation of the internal combustion engine, there can be simultaneous operation of the prechamber spark plug and the spark plug, or alternatively operation of the spark plug or the prechamber spark plug alone to ignite the fuel-air mixture in the combustion chamber of the cylinder. Particularly flexible and efficient operation of the internal combustion engine is enabled as a result.

Preferably, the prechamber spark plug is operated alone during operation of the internal combustion engine under high load, in particular while the spark plug is inactive. Preferably, high load is considered to be operation at a torque of at least 20%, preferably at least 50%, more preferably at least 80%, of a nominal torque of the internal combustion engine. Preferably, this torque threshold can be dependent on a rotational speed of the internal combustion engine, or further key figures, e.g., a lambda number, control times of valves, an engine temperature, or the like. By operating the prechamber spark plug alone at high load, a particularly efficient operation as well as an effective reduction of the knock tendency of the internal combustion engine can be achieved.

Further preferably, the spark plug is operated alone during operation of the internal combustion engine under low load, in particular while the prechamber spark plug is inactive. Preferably, low load is considered to be operation at a torque of less than 80%, preferably less than 50%, more preferably less than 20%, of a rated torque of the internal combustion engine. Doing so enables reliable ignition by means of the spark plug even at low loads.

Particularly preferably, the spark plug is operated during a catalyst heating phase, in particular after a cold start of the internal combustion engine. Preferably, the spark plug is operated alone during the catalyst heating phase, in particular while the prechamber spark plug is inactive. Optimum ignition of the fuel-air mixture can in this way be reliably ensured after a cold start in which, e.g., optimum conditions for the operation of the prechamber spark plug are not yet present.

Preferably, the spark plug alone is operated at low engine temperatures of the internal combustion engine, preferably at engine temperatures of maximum 323 K, in particular maximum 303 K, especially preferably maximum 293 K. For example, a temperature of a coolant of the internal combustion engine can be determined as the engine temperature in order to obtain a particularly simple determination. Alternatively, a combined operation of spark plug and prechamber spark plug can also be performed simultaneously at such low temperatures.

Further preferred is sole operation of the spark plug during a restart of the internal combustion engine, in particular after thrust phases, i.e., after the internal combustion engine has been towed by the vehicle, and preferably at very low loads. Alternatively, combined operation of the spark plug and prechamber spark plug can also take place simultaneously during such a restart of the internal combustion engine.

Preferably, the spark plug and the prechamber spark plug are operated at different, preferably independent, ignition timing points, in particular within a single operating cycle of the internal combustion engine. For example, the spark plug can be operated, preferably at a high load, exclusively during an exhaust stroke, preferably using only the prechamber spark plug to ignite the fuel-air mixture. Doing so enables optimal, complete and efficient combustion depending on the operating state of the internal combustion engine.

Particularly preferably, the internal combustion engine is operated at a lambda number of at least 1 at least within a partial operating range. Particularly preferably, the prechamber spark plug is operated within this partial operating range. Preferably, the spark plug can be inactive within this partial operating range. Alternatively, however, a combined operation of spark plug and prechamber spark plug can also take place. In a further alternative embodiment, within this partial operating range, operation of the spark plug alone can occur, i.e., while the prechamber spark plug is inactive. Particularly preferably, the lambda number within at least one partial operating range of the internal combustion engine is at least 1.05. In other words, in this case the internal combustion engine is operated within the partial operating range with a lean fuel-air mixture. The prechamber spark plug and/or spark plug is preferably operated during lean operation. Doing so enables particularly fuel-efficient operation, wherein reliable ignition of the fuel-air mixture with a low knocking tendency is made possible in particular by the prechamber spark plug.

BRIEF DESCRIPTION OF THE DRAWINGS

Exemplary embodiments of the disclosure are described in detail hereinafter with reference to the accompanying drawings. The drawings include.

DETAILED DESCRIPTION

Figure 1:
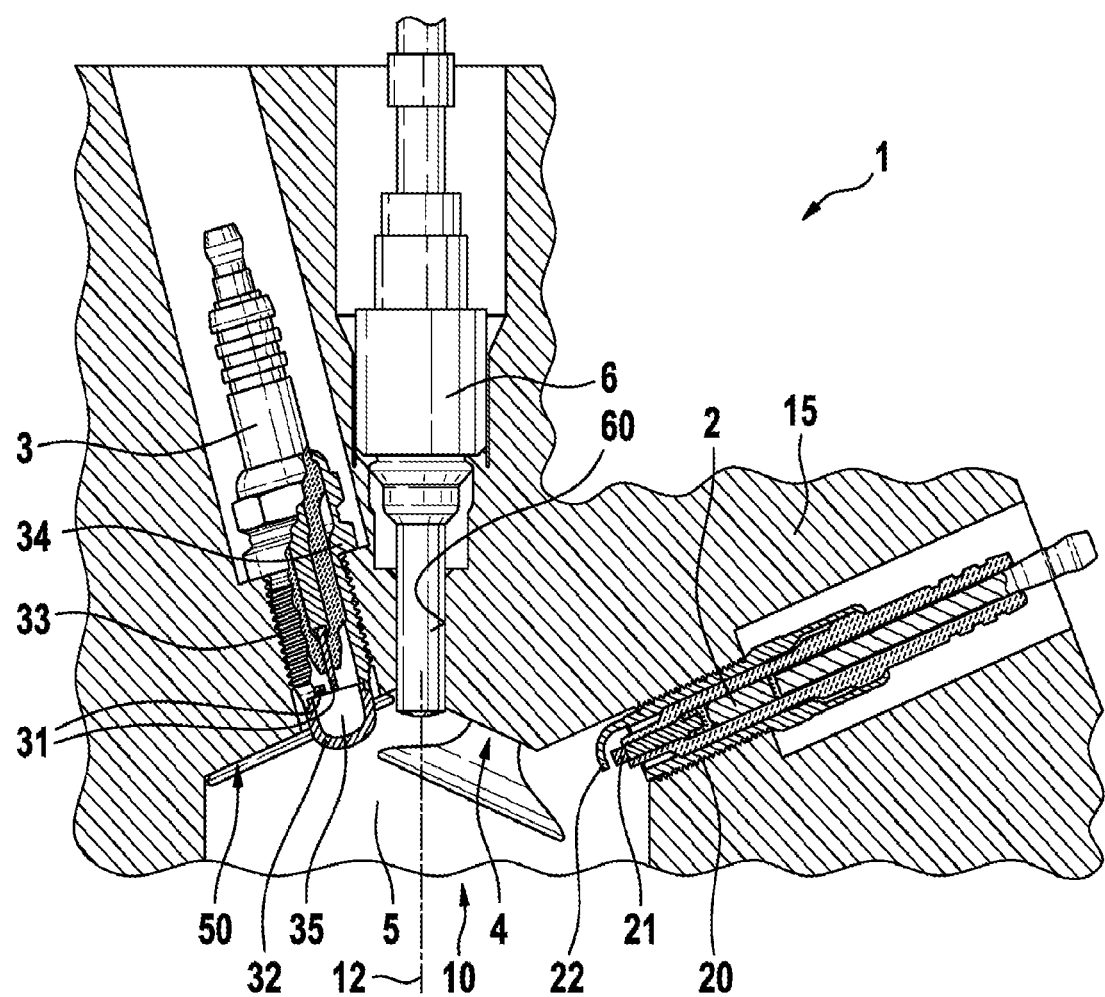
FIG. 1 a sectional view of an internal combustion engine according to a first exemplary embodiment of the disclosure, FIGS. 2a-e simplified schematic detail views of various preferred configurations of the internal combustion engine in FIG. 1, FIGS. 3a-e simplified schematic detail views of further preferred configurations of the internal combustion engine in FIG. 1, FIG. 4 a sectional view of an internal combustion engine according to a second exemplary embodiment of the disclosure, and FIGS. 5a-e simplified schematic detail views of various preferred configurations of the internal combustion engine in FIG. 4.

FIG. 1 shows a simplified sectional view of an internal combustion engine 1 according to a first exemplary embodiment of the disclosure. The internal combustion engine 1 comprises several cylinders 10, with only one of the cylinders 10 being shown in FIG. 1. The cylinder 10 comprises a combustion chamber 5 which is delimited at its upper end by a combustion chamber roof 50. The combustion chamber roof 50 is formed by a cylinder head 15 of the internal combustion engine 1. The combustion chamber roof 50 is preferably conical or tapered towards the top, with a roof apex forming in particular in the center point 54 (see FIG. 2) of the combustion chamber roof 50. The center point 54 in this case lies centrally, in particular on a central axis 12 of the preferably circular cylinder 10.

For each cylinder 10, the internal combustion engine 1 comprises four charge-exchange ports 4. (see also FIG. 2). A first and a second charge-exchange port 4 each form an inlet port 41 through which fresh air can flow into the combustion chamber 5. A third and a fourth charge-exchange port 4 each form an outlet port 42 through which exhaust gases can flow out of the combustion chamber 5 after combustion.

Furthermore, the internal combustion engine 1 comprises a combustion chamber fuel injector 6 per cylinder 10, which is configured to inject liquid or gaseous fuel directly into the combustion chamber 5. The combustion chamber fuel injector 6 projects slightly into the combustion chamber 5. Alternatively, the combustion chamber fuel injector 6 may be retracted within an injector bore 60 in which it is arranged.

In addition, the internal combustion engine 1 comprises one spark plug 2 and one prechamber spark plug 3 per cylinder 10.

The spark plug 2 is an ordinary spark plug which is configured to ignite a fuel-air mixture located in the combustion chamber 5 by means of an electric spark. For this purpose, the spark plug 2 can comprise a center electrode 21, and a lateral, hook-shaped front electrode 22, which in particular forms the earth electrode. The ignition spark can be generated between the two electrodes 21, 22. The spark plug 2 may be arranged in a bore 20 within the cylinder head 15 as shown in FIG. 1, the bore 20 port into the combustion chamber 5. Alternatively, the spark plug 2 can also protrude into the combustion chamber 5.

The prechamber spark plug 3 comprises a plug cap 32 arranged at an axial end of a housing 34 of the prechamber spark plug 3. The plug cap 32 thereby forms a prechamber 35 within the prechamber spark plug 3, the prechamber 35 communicating with the combustion chamber 5 via (not shown) passage ports which penetrate the plug cap 32. By means of electrodes 31, a fuel-air mixture can be ignited inside the prechamber 35 so that several, preferably four, flare jets 30 (see FIG. 2, FIG. 3, or FIG. 5; shown schematically as lobe-shaped jets emanating from the prechamber spark plug 3), in particular in the form of flames, spread through the passage ports into the combustion chamber 5 in order to ignite the fuel-air mixture therein. The prechamber spark plug 3 is screwed into a bore 33 in the cylinder head 15. The prechamber spark plug 3 is screwed in so that the plug cap 32 projects into the combustion chamber 5.

The prechamber spark plug 3 is optimized for operation of the internal combustion engine 1 under high load and while the internal combustion engine 1 is operated using a stoichiometric or lean fuel-air mixture. Due to the special ignition method of the prechamber spark plug 3, the fuel-air mixture can be ignited reliably and with a low knocking tendency of the internal combustion engine 1. Doing so can enable particularly fuel-efficient operation of the internal combustion engine 1 without the risk of damage due to knocking.

The spark plug 2 is operated in particular after a cold start, during a catalytic converter heating operation and at low loads in order to enable reliable ignition of the fuel-air mixture in the combustion chamber 5 even in these operating ranges.

Figure 2:
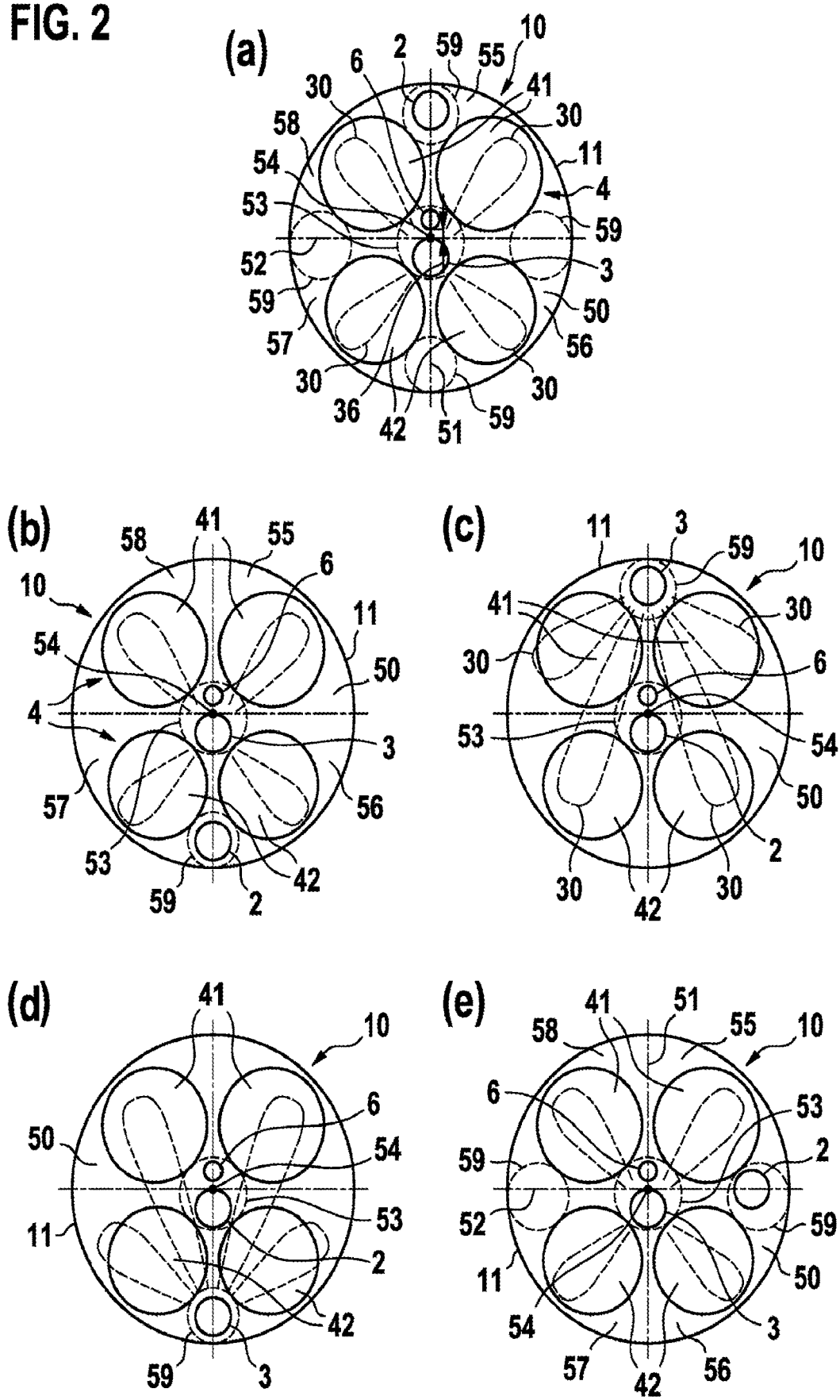
Figure 3:
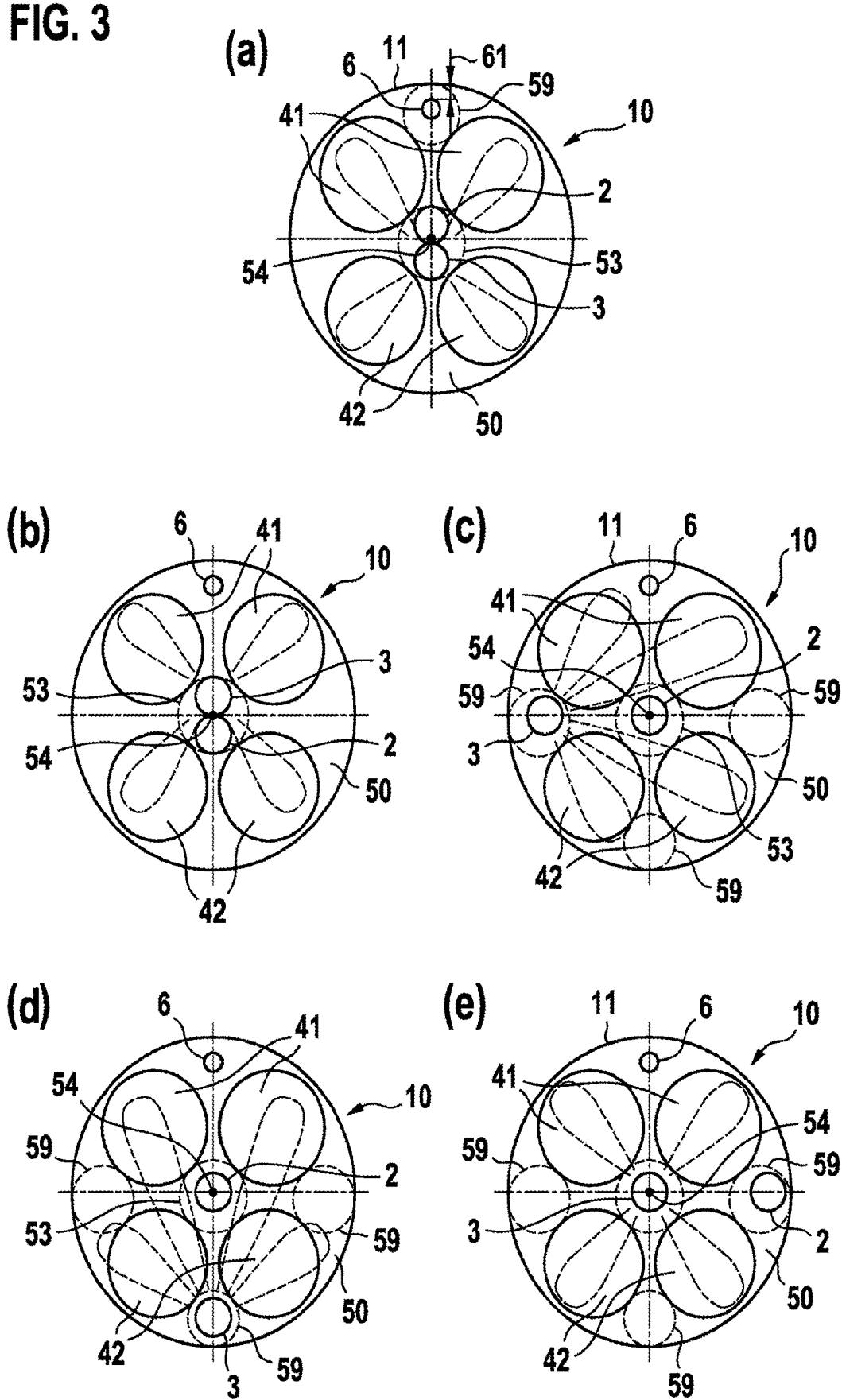

In FIGS. 2 and 3, several preferred variants for arrangements of combustion chamber fuel injector 6, spark plug 2 and prechamber spark plug 3 on combustion chamber roof 50 are shown schematically in simplified form, which are described below. A top view of the combustion chamber roof 50 is shown along a piston direction, along which a piston (not shown) of the internal combustion engine 1 can move. The piston direction is parallel to the central axis 12 of the cylinder 10.

As can be seen in FIGS. 2 and 3, all four charge exchange ports 4 have an identical cross-section. Alternatively, the inlet ports 41 and the outlet ports 42 could also have different cross sections. Particularly preferably, the inlet ports 41 could each have larger cross-sections than the outlet ports 42. Alternatively, the outlet ports 42 could each have larger cross-sections than the inlet ports 41. The charge exchange ports 4 are each circular in shape, and are inscribed in the combustion chamber roof 50 such that a maximum total cross section is available for the charge exchange. Alternatively, the charge-exchange ports 4 could also be smaller.

Figure 5:
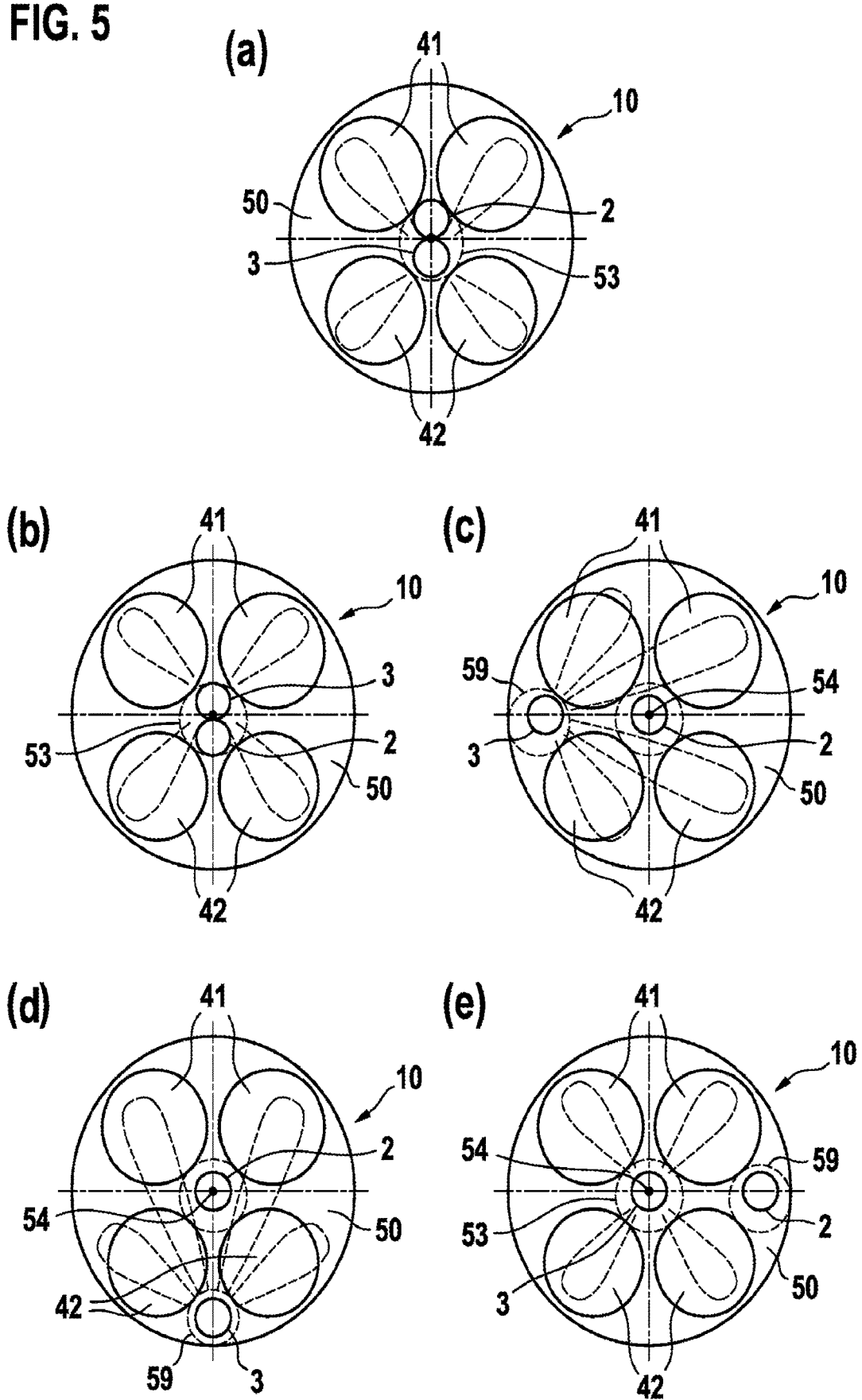

For a simplified description of the position of the elements on the combustion chamber roof 50, two sectional planes 51, 52 are drawn perpendicular to each other and parallel to the piston direction. The two sectional planes 51, 52 thereby divide the combustion chamber roof 50 into four quadrants 55, 56, 57, 58, such that one of the four charge-exchange ports 4 is located in each quadrant 55, 56, 57, 58. In particular, the two sectional planes 51, 52 can also be considered as symmetry planes of the combustion chamber roof 50. As can be seen in FIGS. 2, 3, and 5, the components arranged on the combustion chamber roof 50—the spark plug 2, the prechamber spark plug 3, and the combustion chamber fuel injector 6—are each located essentially on one of the two sectional planes 51, 52, since this is where the greatest space is available for these components.

FIG. 2 shows variants of arrangements of the components in the combustion chamber roof 50 with a central position of the combustion chamber fuel injector 6. A central location is in this context considered to be within a center point area 53 surrounding a center point 54 of the combustion chamber roof 50 and located substantially radially inward of the charge exchange ports 4. Due to the central position of the combustion chamber fuel injector 6, a particularly even distribution of the injected fuel spray in the combustion chamber 5 can be achieved.

In all of the variants shown in FIG. 2, the combustion chamber fuel injector 6 is located on the inlet side of the center point 54, i.e. closer to the two inlet ports 41 than to the outlet ports 42. In detail, the combustion chamber fuel injector 6 is located entirely within the two inlet-side quadrants 55, 58. As a result, there is space within the center point area 53 for another component, i.e., the spark plug 2 or the prechamber spark plug 3.

The combustion chamber roof 50 further comprises four side regions 59, which are each arranged between two adjacent charge exchange ports 4 and a sidewall 11 of the cylinder 10, and within which components can be arranged.

FIG. 2(a) shows an arrangement with the prechamber spark plug 3 within the center point area 53. Doing so makes it possible to achieve the most central possible ignition of the fuel-air mixture by means of the prechamber spark plug 3, wherein particularly uniform penetration of the combustion chamber 5 by means of the flare jets 30 and thus particularly uniform ignition in the combustion chamber 5 can be achieved. In addition, a distance 36 between prechamber spark plug 3 and combustion chamber fuel injector 6 can be kept to a minimum as a result, which has an advantageous effect on scavenging and mixture supply to prechamber 35.

In this regard, the prechamber spark plug 3 is designed and arranged such that flare jets 30 generated during its operation are oriented substantially uniformly in the direction of each of the four charge-exchange ports 4. It should be noted that the orientation of the flare jets 30 in the drawings is illustrated only by way of example. Rather, any desired orientation of the flare jets 30 is possible. For example, in a further advantageous embodiment, at least one of the flare jets 30 is aligned parallel to one of the sectional planes 51, 52, preferably when the prechamber-spark plug 3 is located on one of these sectional planes 51, 52. It is particularly advantageous if at least one of the flare jets 30 is always directed toward the inlet side of the combustion chamber 5, that is, toward one of the inlet ports in 41.

Due to the proximity of the combustion chamber fuel injector 6 and the prechamber spark plug 3, the arrangement in FIG. 2(a) also offers a particularly efficient mode of operation of the internal combustion engine 1 during operation of the prechamber spark plug 3, since the generated spray can be ignited in a particularly targeted and reliable manner by the flare jets 30. In addition, the proximity of combustion chamber fuel injector 6 and prechamber spark plug 3 can achieve effective scavenging of prechamber 35 of prechamber spark plug 3 and optimum mixture supply, which is particularly beneficial to robust and effective operation of prechamber spark plug 3.

In the variant in FIG. 2(a), the spark plug 2 is arranged laterally, close to the side wall 11 of the cylinder 10. In detail, the spark plug 2 is arranged in the inlet side lateral area 59, which is located in the two inlet side quadrants 55, 58, i.e. close to the two inlet ports 41. Doing so enables an advantageous supply of fresh air to be provided in the area of the spark plug 2 during operation of the spark plug 2.

FIG. 2(*b*) shows an arrangement which corresponds essentially to the arrangement in FIG. 2(*a*), with the difference that the spark plug 2 is arranged in the outlet-side lateral region 59, i.e., close to the two outlet ports 42. Doing so enables, e.g., the combustion chamber fuel injector 6 to be oriented more toward the outlet ports 42 to bring the fuel spray close to the plug 3 and spark plug 2.

FIG. 2(*c*) shows an arrangement similar to FIG. 2(*a*), with the positions of spark plug 2 and prechamber spark plug 3 reversed. That is, the spark plug 2 is located in the center point area 53 close to the combustion chamber fuel injector 6 and the prechamber spark plug 3 is located on the inlet side close to the side wall 11. The central arrangement of the spark plug 2 close to the center point 54 and close to the combustion chamber fuel injector 6 can thereby enable particularly robust and efficient operation of the internal combustion engine during ignition by means of the spark plug 2, preferably at low loads and/or during a catalyst heating phase.

The prechamber spark plug 3 is designed and arranged such that the flare jets 30 are aligned in the direction of the center of the combustion chamber roof. Doing so enables particularly fuel-efficient operation of the internal combustion engine 1 even when the prechamber spark plug 3 is operated alone, e.g., in medium or high load ranges. In addition, the lateral arrangement of the prechamber spark plug 3, due to its distance from the center of the combustion chamber 5, offers the advantage of lower temperatures acting on the plug cap 32, thus enabling a lower load and a longer service life of the prechamber spark plug 3.

FIG. 2(*d*) shows an arrangement which corresponds essentially to the arrangement in FIG. 2(*c*), with the difference that the prechamber spark plug 3 is arranged in the outlet-side lateral region 59, i.e., on the outlet side of spark plug 2 and combustion chamber fuel injector 6. In this case, the flare jets 30 generated by the prechamber spark plug 3 are directed toward the inlet ports 41.

FIG. 2(*e*) shows an arrangement similar to FIGS. 2(*a*) and (*b*) with central pre-chamber spark plug 3, a spark plug 2 being arranged in a side region 59 lying on the second sectional plane 52. In this case, the side region 59 is located in one of the two inlet-side quadrants 55, 58 and one of the two outlet-side quadrants 56, 57. As a result a particularly advantageous installation position can be provided for the spark plug 2 in the cylinder head 15, since the inlet ports 41 and outlet ports 42 connected to the intake ports and exhaust ports often point away from each other within the cylinder head 15. As an alternative to the position shown in FIG. 2(*e*) in the right-hand side region 59 of quadrants 55 and 56, spark plug 2 can also be arranged in the left-hand side region 59 of quadrants 57 and 58.

FIG. 3 shows variants in which the combustion chamber fuel injector 6 is arranged laterally on the combustion chamber roof 50, i.e., in the inlet-side lateral region 59. The combustion chamber fuel injector 6 is in this case arranged at a small distance 61 from the sidewall 11. The lateral arrangement of the combustion chamber fuel injector 6 means that there is plenty of space available for the spark plug 2 and the prechamber spark plug 3 in the central center point area 53 of the combustion chamber roof 50 around the center point 54, so that these can both be arranged as centrally as possible for improved uniform ignition. In this case, an injection direction of the combustion chamber fuel injector 6 is aligned in the direction of the center of the combustion chamber in order to achieve the most uniform distribution of the fuel spray in the combustion chamber 5.

FIG. 3(*a*) and FIG. 3(*b*) show variants in which the spark plug 2 and also the prechamber spark plug 3 are arranged within the center point area 53. As a result, both the spark plug 2 and the prechamber spark plug 3 are located as close as possible to the center point 54 of the combustion chamber roof 50, which enables optimum operation for both with the most central uniform ignition possible. FIG. 3(*a*) shows a variant in which the spark plug 2 is arranged on the inlet side of the prechamber spark plug 3, while FIG. 3(*b*) shows a variant in which the spark plug 2 is arranged on the outlet side of the prechamber spark plug 3.

FIG. 3(*c*) and FIG. 3(*d*) also show variants in which the spark plug 2 is arranged centrally and the prechamber spark plug 3 is arranged laterally on the combustion chamber roof 50. Doing so particularly advantageous if there is not enough space in the center point area 53 for both the spark plug 2 and the prechamber spark plug 3. The spark plug 2 in both variants is in this case arranged exactly in the center point 54 of the combustion chamber roof 50, which enables particularly robust operation of the internal combustion engine 1 during operation of the spark plug 2, e.g., during a catalyst heating phase.

In FIG. 3(*c*), the prechamber spark plug 3 is arranged in the left-hand side area 59, which lies between the sidewall 11 and one of the inlet ports 41 and one of the outlet ports 42.

FIG. 3(*d*) also shows a variant in which the prechamber spark plug 3 is arranged in the outlet-side lateral region 59, i.e., close to the two outlet ports 42.

It should be noted that, as an alternative to the variants shown in FIG. 3(*c*) and in FIG. 3(*d*), it is also possible to arrange the pre-chamber spark plug 3 in any other of the side regions 59.

FIG. 3(*e*) also shows a variant in which the prechamber spark plug 3 is arranged centrally, i.e., exactly in the center point 54 of the combustion chamber roof 50. This makes it possible to achieve particularly uniform, symmetrical ignition in the combustion chamber 5 during operation of the prechamber spark plug 3. In this case, the spark plug 2 is located in the right side area 59, i.e. between the sidewall 11, one of the two inlet ports 41 and one of the two outlet ports 42. Alternatively, the spark plug may be located in any other of the side regions 59.

Figure 4:
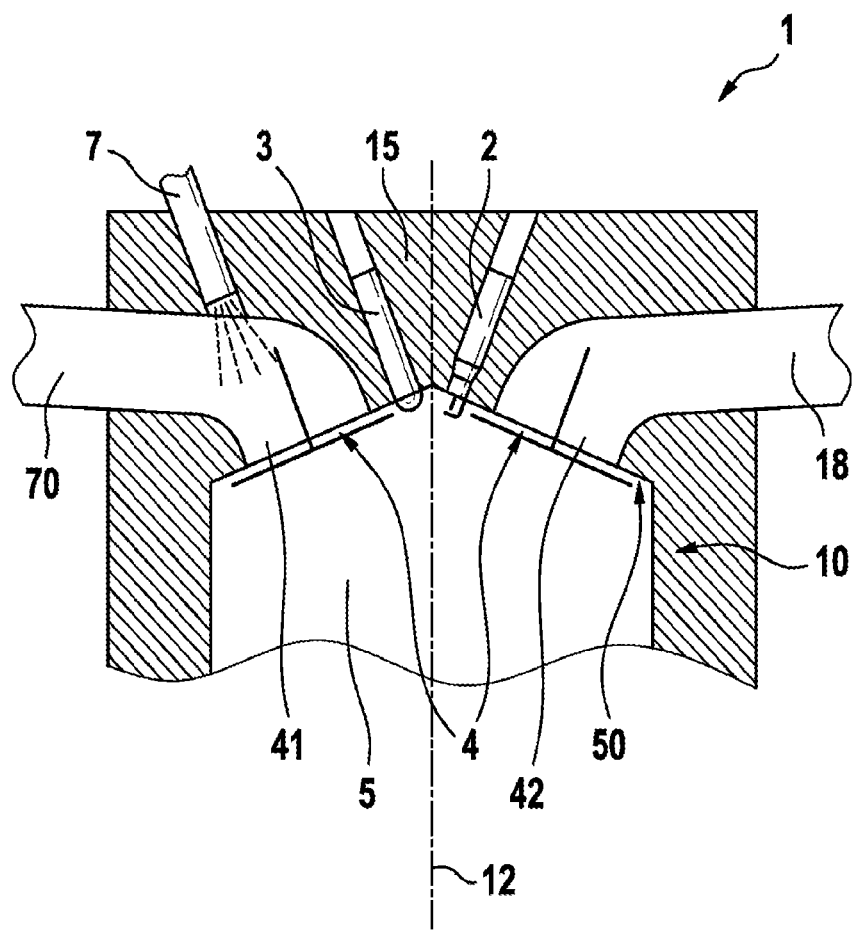

FIG. 4 shows a sectional view of an internal combustion engine 1 according to a second exemplary embodiment of the disclosure. The second exemplary embodiment corresponds essentially to the first exemplary embodiment of FIGS. 1 to 3, with the difference that instead of a combustion chamber fuel injector 6 arranged in the combustion chamber roof 50 and injecting directly, an intake manifold fuel injector 7 is provided. The intake manifold fuel injector 7 is located in the cylinder head 15 and on an intake manifold 70 and is configured to inject liquid or gaseous fuel into the intake manifold 70. The intake manifold 7 opens into the combustion chamber 5 at the inlet port 41 and thus directs the fuel-air mixture into the combustion chamber 5. In particular, one intake manifold 70 is provided for each inlet port 41, with one intake manifold fuel injector 7 being provided on each intake manifold 70 (not shown).

FIG. 5 shows variants of the arrangements of spark plug 2 and prechamber spark plug 3 on the combustion chamber roof 50 of the internal combustion engine 1 of the second exemplary embodiment in FIG. 4. Since no fuel injector is arranged on the combustion chamber roof 50 in the second embodiment, more space is advantageously available for the spark plug 2 and the prechamber spark plug 3. The arrangements in FIG. 5 are similar to FIG. 3, resulting in essentially the same advantages.

Particularly preferably, the spark plug 2 and the prechamber spark plug 3 can both be arranged in the center point area 53. This arrangement is shown in the variants of FIGS. 5(*a*) and (*b*), with the spark plug 2 in FIG. 5(*a*) being arranged on the inlet side of the prechamber spark plug 3, and the spark plug 2 in FIG. 5(*b*) being arranged on the outlet side of the prechamber spark plug 3.

FIG. 5(*c*) and FIG. 5(*d*) further show variants with a central spark plug 2, which is arranged exactly in the center point 54 of the combustion chamber roof 50.

In FIG. 5(*c*), the prechamber spark plug 3 is arranged in the left side area 59, and in FIG. 5(*d*) in the outlet side area 59.

FIG. 5(*e*) also shows a variant with a central prechamber spark plug 3 arranged exactly in the center point 54. In this variant, the spark plug 2 is located in the right side area 59.

Similar to FIG. 3, it should be noted that the laterally arranged spark plug 2 or prechamber spark plug 3 can also be arranged in any of the four side areas 59 as an alternative to the positions shown in FIG. 5(*c*) to FIG. 5(*e*).

It should be noted that all distances referred to are minimum distances. In other words, a "distance between prechamber spark plug and combustion chamber fuel injector" is, e.g., considered to be the minimum distance of an outer circumference of the spark plug, particularly substantially in a plane of the combustion chamber roof, from the outer circumference of the and combustion chamber fuel injector.

The invention claimed is:

1. An internal combustion engine, comprising:
    at least one cylinder;
    four charge-exchange ports per the at least one cylinder, wherein a first and a second charge exchange port are each an inlet port, and wherein a third and a fourth charge exchange port are each an outlet port; and
    one spark plug and one prechamber spark plug per the at least one cylinder, the spark plug and/or the prechamber spark plug arranged on a combustion chamber roof of a combustion chamber of the cylinder,
    wherein
    the spark plug is arranged closer to a center of the combustion chamber roof than the prechamber spark plug, or the prechamber spark plug is arranged closer to a side wall of the at least one cylinder than the spark plug.

2. The internal combustion engine according to claim 1, wherein the prechamber spark plug is arranged closer to at least one of the inlet ports or closer to at least one of the outlet ports than the spark plug.

3. The internal combustion engine according to claim 1, wherein the spark plug is arranged on the inlet side or outlet side to the prechamber spark plug.

4. The internal combustion engine according to claim 1, wherein:
    the charge exchange ports are arranged in the combustion chamber roof;
    the combustion chamber roof is divided into four quadrants by two mutually perpendicular sectional planes such that one of the four charge exchange ports is arranged in a respective one of the four quadrants; and
    the spark plug and/or the prechamber spark plug is arranged on one of the sectional planes.

5. The internal combustion engine according to claim 1, wherein the spark plug and/or the prechamber spark plug is arranged exactly on a center point of the combustion chamber roof which lies substantially radially within the charge exchange ports.

6. The internal combustion engine according to claim 1, wherein the spark plug and/or the prechamber spark plug is arranged between two adjacent charge exchange ports and the side wall of the at least one cylinder.

7. The internal combustion engine according to claim 1, further comprising a combustion chamber fuel injector adapted to inject fuel directly into the combustion chamber.

8. The internal combustion engine according to claim 7, wherein the combustion chamber fuel injector is arranged on the combustion chamber roof.

9. The internal combustion engine according to claim 7, wherein the combustion chamber fuel injector is arranged between the two inlet ports, and the side wall of the at least one cylinder.

10. The internal combustion engine according to claim 7, wherein the combustion chamber fuel injector is arranged exactly on a center point of the combustion chamber roof that lies substantially radially within the charge exchange ports.

11. The internal combustion engine according to claim 7, wherein:
    the prechamber spark plug is arranged closer to the combustion chamber fuel injector than the spark plug; or
    the spark plug is arranged closer to the combustion chamber fuel injector than the prechamber spark plug.

12. The internal combustion engine according to claim 7, wherein an injection direction of the combustion chamber fuel injector is oriented in the direction of the spark plug or the prechamber spark plug.

13. The internal combustion engine according to claim 1, further comprising an intake manifold fuel injector adapted to inject fuel into an intake manifold of the internal combustion engine.

14. A method for operating an internal combustion engine having at least one cylinder, the internal combustion engine having four charge exchange ports per at least one cylinder and a spark plug and a prechamber spark plug, comprising:
    providing the spark plug and the prechamber spark plug; and
    operating the spark plug and/or the prechamber spark plug to ignite a fuel/air mixture within a combustion chamber of the at least one cylinder.

15. The method according to claim 14, wherein:
    the internal combustion engine is operated under a torque of at least 80% of a nominal torque of the internal combustion engine; and
    during the operation of the internal combustion engine at the torque of at least 80%, of the nominal torque of the internal combustion engine, the prechamber spark plug is operated alone.

16. The method according to claim 14, wherein:
    the internal combustion engine is operated under a torque of less than 20% of a nominal torque of the internal combustion engine; and
    during the operation of the internal combustion engine under the torque of less than 20%, of the nominal torque of the internal combustion engine, the spark plug is operated alone.

17. The method according to claim 14, wherein the spark plug is operated during a catalyst heating phase, after a cold start of the internal combustion engine.

18. The method according to claim 14, wherein the spark plug and the prechamber spark plug are operated with different, mutually independent, ignition times.

19. The method according to claim 14, wherein the internal combustion engine is operated with a lambda number of at least 1, at least within a partial operating range, during operation of the spark plug and/or prechamber spark plug.

* * * * *